United States Patent
Schnieders et al.

(10) Patent No.: US 9,682,724 B2
(45) Date of Patent: Jun. 20, 2017

(54) STEERING ANGLE SENSOR

(71) Applicant: TAKATA AG, Aschaffenburg (DE)

(72) Inventors: Axel Schnieders, Karlstein (DE); Markus Stollberg, Hösbach (DE); Stefan Geppert, Karlstein (DE); Thomas Sauerwein, Großwallstadt (DE); Andreas Langheinrich, Berg (DE)

(73) Assignee: TAKATA AG (DE)

( * ) Notice: Subject to any disclaimer, the term of this patent is extended or adjusted under 35 U.S.C. 154(b) by 0 days.

(21) Appl. No.: 14/639,327

(22) Filed: Mar. 5, 2015

(65) Prior Publication Data

US 2015/0251698 A1    Sep. 10, 2015

(30) Foreign Application Priority Data

Mar. 6, 2014   (DE) .................. 10 2014 102 982

(51) Int. Cl.
*F16H 55/18* (2006.01)
*B62D 15/02* (2006.01)
(Continued)

(52) U.S. Cl.
CPC ........... *B62D 15/0215* (2013.01); *F16H 1/02* (2013.01); *G01D 5/145* (2013.01); *Y10T 74/19623* (2015.01); *Y10T 74/19651* (2015.01)

(58) Field of Classification Search
CPC ......... G01D 5/145; F16H 1/02; F16H 1/2836; F16H 55/06; F16H 55/17;
(Continued)

(56) References Cited

U.S. PATENT DOCUMENTS 4,249,429 A * 2/1981 Denning ................. F16H 48/08
                                                    475/241
5,930,905 A * 8/1999 Zabler ...................... G01D 5/04
                                                    33/1 PT
(Continued)

FOREIGN PATENT DOCUMENTS

DE         101 58 287 A1    6/2003
DE       202005008274    *  3/2004  ............. F16H 55/08
(Continued)

*Primary Examiner* — William Kelleher
*Assistant Examiner* — Zakaria Elahmadi
(74) *Attorney, Agent, or Firm* — Fitch Even Tabin & Flannery LLP

(57) ABSTRACT

A steering angle sensor, equipped for installation in a steering arrangement of a motor vehicle, is provided. The steering angle sensor comprises a rotatably mounted first gearwheel which upon actuation of the steering arrangement rotates about an axis and at least one rotatably mounted second gearwheel which is in engagement with the first gearwheel and is carried along with a rotary movement of the first gearwheel, so that with reference to a rotary movement of the second gearwheel a steering angle of the steering arrangement can be determined. The teeth of at least one of the gearwheels are tapered in axial direction along the tooth width such that a respective tooth of the one gearwheel, which is tapered along the tooth width, with wedge action can be fitted into a tooth gap of the gearwheel in engagement therewith.

16 Claims, 4 Drawing Sheets

(51) Int. Cl.
*G01D 5/14* (2006.01)
*F16H 1/02* (2006.01)

(58) Field of Classification Search
CPC ....... F16H 2001/2881; F16H 2055/065; F16H 55/0886; B62D 15/0215
USPC .......... 74/409, 440, 492, 496; 180/447, 409, 180/400
See application file for complete search history.

(56) References Cited

U.S. PATENT DOCUMENTS

| | | | | |
|---|---|---|---|---|
| 6,367,337 | B1* | 4/2002 | Schlabach | B62D 6/10 180/443 |
| 6,814,037 | B1* | 11/2004 | Smith | F01L 1/022 123/90.15 |
| 7,383,750 | B2* | 6/2008 | Menjak | B23P 15/14 74/409 |
| 7,677,131 | B2* | 3/2010 | Chapelain | B62D 1/105 74/409 |
| 7,841,231 | B2* | 11/2010 | Kang | B62D 15/0215 73/117.02 |
| 8,215,188 | B2* | 7/2012 | Klimenko | B62D 6/10 73/862.31 |
| 2003/0094054 | A1* | 5/2003 | Font | B62D 15/02 73/862.328 |
| 2004/0154422 | A1* | 8/2004 | Menjak | B62D 1/105 74/440 |
| 2005/0000749 | A1* | 1/2005 | Sato | F16D 41/086 180/402 |
| 2006/0201271 | A1* | 9/2006 | Masui | F16H 55/18 74/409 |
| 2007/0102226 | A1* | 5/2007 | Matsuda | B62D 15/022 180/400 |
| 2008/0000712 | A1* | 1/2008 | Tanaka | B60R 16/027 180/409 |
| 2008/0110690 | A1* | 5/2008 | Lee | B62D 15/0215 180/447 |
| 2010/0218638 | A1* | 9/2010 | Shiina | B62D 5/008 74/496 |
| 2010/0242649 | A1* | 9/2010 | Vandewal | F16H 55/18 74/409 |
| 2010/0275709 | A1* | 11/2010 | Vandewal | F16H 57/12 74/409 |
| 2014/0208890 | A1* | 7/2014 | Takayanagi | B62D 15/0215 74/552 |
| 2014/0246267 | A1* | 9/2014 | Takayanagi | B62D 5/0457 180/446 |

FOREIGN PATENT DOCUMENTS

DE    20 2005 008 274 U1    11/2005
WO              96/27116 A1    9/1996

* cited by examiner

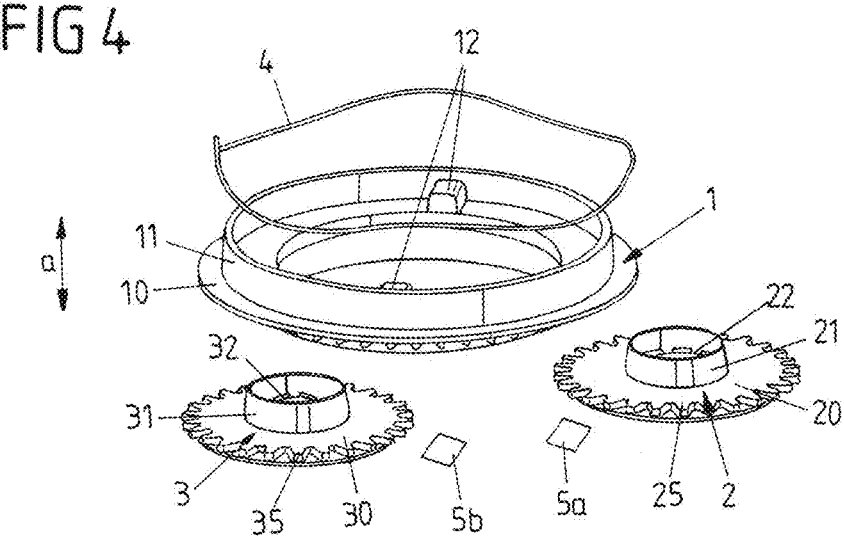
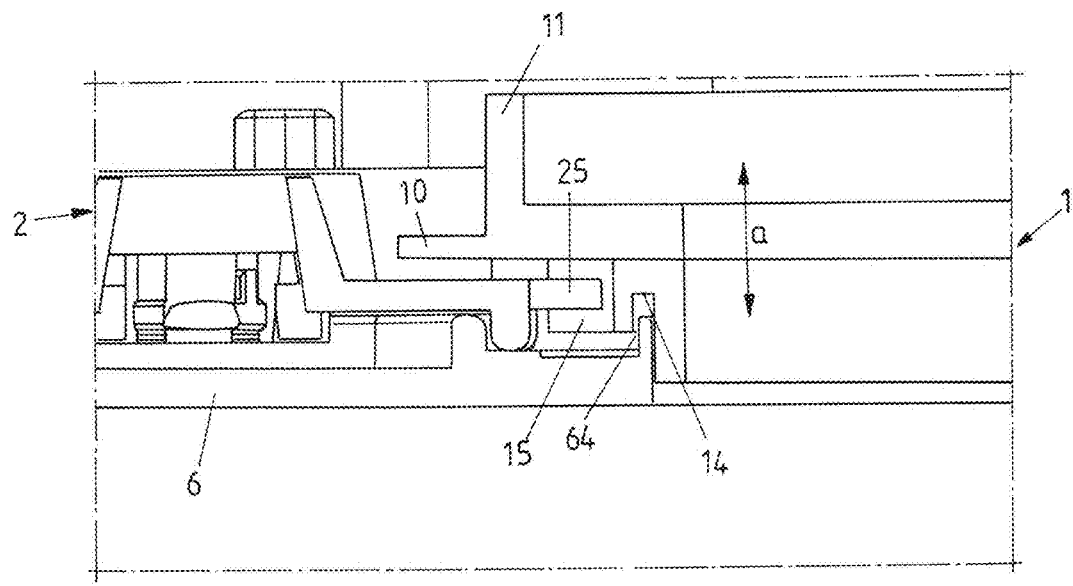

STEERING ANGLE SENSOR

CROSS-REFERENCE TO RELATED APPLICATION

This application claims priority to German Patent Application No. 10 2014 102 982.8 filed on Mar. 6, 2014, the entirety of which is incorporated by reference herein.

BACKGROUND

This invention relates to a steering angle sensor, which is equipped for installation in a steering arrangement of a motor vehicle.

Such steering angle sensor comprises a rotatably mounted (about a first axis) first gearwheel which upon actuation of the steering arrangement rotates about its axis, and at least one rotatably mounted (about a further axis) second gearwheel which is in engagement with the first gearwheel and which thereby is carried along with a rotary movement of the first gearwheel, so that it rotates about its own axis and with reference to the rotary movement of the second gearwheel a steering angle of the steering arrangement can be determined.

The steering arrangement in particular can be a steering arrangement which includes a steering wheel rotatably mounted about a steering axle. While a steering wheel is turned by a driver, a torque is introduced into a steering gear associated to the steering wheel, which triggers a rotary movement at components of the steering gear. A steering angle representative for such steering arrangement can relate both to the steering wheel itself and to a component of the steering gear associated to the steering wheel. Furthermore, an operating element other than a steering wheel also can be used for generating a corresponding torque and a steering angle connected therewith.

A known steering angle sensor of the type mentioned above comprises a transmission with a rotatably mounted central gearwheel and two satellite gearwheels in engagement therewith, wherein the central gearwheel is rotated upon actuation of the associated steering arrangement and thereby carries along the two satellite gearwheels. On each of the satellite gearwheels a magnet, e.g. a permanent magnet, is arranged, whose magnetic field changes its spatial orientation during a rotary movement of the corresponding satellite gearwheel. This can be detected by a detector associated to the respective satellite gearwheel, from which in turn a steering angle of the associated steering arrangement can be determined, cf. WO 96/27116 A1.

By using two satellite gearwheels with different size and/or different tooth numbers different gear ratios can be achieved when the respective satellite gearwheel interacts with the central gearwheel. By the combined determination of the change of the magnetic field on both satellite gearwheels, it then is possible to not only determine changes of the steering angle, but also absolute values of the steering angle.

The accuracy in the detection of the steering angle among other things depends on the quality of the engagement between the gearwheels of the steering angle sensor. In particular, a clearance between the toothings in engagement with each other can lead to inaccuracies in the determination of the steering angle.

SUMMARY

Therefore, it is the problem underlying the invention to further improve a steering angle sensor as mentioned above, in order to provide for a highly accurate determination of the steering angle.

According to the invention, this problem is solved by creating a steering angle sensor with the features as described herein.

Accordingly, the teeth of at least one of the gearwheels of the steering angle sensor are tapered in axial direction (i.e. along the axis of rotation of the corresponding gearwheel) and hence also along the tooth width such that a respective tooth of the gearwheel concerned, which is tapered along its tooth width, can be fitted with wedge action (axially) into a tooth gap of another gearwheel in engagement therewith, and the toothings on both sides thereby rest against each other without any clearance in rotary or circumferential direction of the gearwheels.

Expressed in other words, the flanks of the teeth of the one gearwheel extend with an inclination along the tooth width (i.e. in axial direction), so that the tooth thickness of the tapered teeth decreases in axial direction/along the tooth width of the respective tooth. (Accordingly, the tooth flanks of a respective tooth in particular also extend with an inclination to the axis of rotation of the corresponding gearwheel). The teeth of this gearwheel thereby can be introduced in axial direction into the tooth gaps of the counter-toothing of the other gearwheel in engagement therewith to such an extent that an engagement free from clearance (in rotary or circumferential direction) is effected.

The so-called tooth flank clearance of the toothings in engagement with each other thereby is (largely) eliminated. This is important above all in the case of a reversal of the direction of rotation during a steering operation.

The teeth of the one gearwheel in particular can be designed such that they are conically tapered in cross-section along the tooth width. Correspondingly, the two flanks of a respective tooth run towards each other with the same amount of inclination with respect to a middle axis of the tooth extending in axial direction and each have the same distance from that middle axis. Depending on the application, the distances from that middle axis however also can be different (asymmetrical).

According to one development of the invention, the toothings of both gearwheels in engagement with each other each have teeth which are tapered in axial direction along the tooth width, namely in the case of a proper engagement of the toothings on both sides with an orientation opposite to each other. Axially fitting the teeth of one gearwheel into the associated gaps at the other gearwheel (by eliminating the clearance in circumferential direction) thereby can be optimized. In particular, it can be provided that the tooth flanks of the tapered teeth at the two gearwheels in engagement with each other run towards each other with an inclination with the same amount of angle with respect to the axial direction, but with the opposite spatial orientation.

To ensure an engagement free from clearance of the toothings on both sides of the first and second gearwheel, the tapered teeth of one gearwheel being axially fitted into the gaps of the other gearwheel, at least one of the gearwheels is (axially) pretensioned in direction of an engagement with the interacting gearwheel. For this purpose, there can be used an elastic element, in particular in the form of a spring, which acts on the corresponding gearwheel. Useful springs include for example a sinuous spring or a so-called SMD spring which is designed for use on printed circuit boards.

Furthermore, it is proposed to axially movably mount the elastically pretensioned gearwheel, in order to provide for a defined engagement into the toothing of the interacting gearwheel under the action of the pretension. The corresponding gearwheel for example can axially shiftably be mounted on a guide. The latter can be formed on a receptacle or a housing part of the steering angle sensor. Concretely, for guiding the gearwheel, a guide element can engage into an associated guide opening, of which the one element is formed on the corresponding gearwheel and the other one is formed on the receptacle or on the housing part.

The first gearwheel advantageously includes a coupling element via which the gearwheel is to be coupled with a steering arrangement such that it is carried along upon actuation of the steering arrangement.

To the at least one second gearwheel a sensor device is associated, by means of which the rotary movement of the second gearwheel can be detected, in order to therefrom determine the steering angle of the associated steering arrangement. For this purpose, a magnet for example can be arranged on the second gearwheel, which generates a magnetic field whose spatial orientation changes during a rotation of the second gearwheel, which can be detected by an associated detector, such as for example a Hall sensor.

However, any other type of sensor device can be used as well, by means of which a rotation of the at least one second gearwheel can be detected and be determined quantitatively, such as e.g. the optical scanning of the toothing of the second gearwheel.

If the first gearwheel coupled with the steering arrangement is in engagement with two second gearwheels, which during a rotation of the first gearwheel are carried along with different rotational speeds, not only changes of the steering angle, but also the absolute value of the steering angle can be determined by detecting the extent of the rotation of the two second gearwheels.

A steering arrangement with a steering angle sensor according to the invention is also described herein.

BRIEF DESCRIPTION OF THE DRAWINGS

Further details and advantages of the invention will become apparent from the following description of an exemplary embodiment with reference to the Figures.

FIG. 4 shows an exploded representation of the gearwheel assembly from FIG. 1 together with further components of a steering angle sensor.

FIG. 5 shows details of a possible support of gearwheels of a gearwheel assembly according to FIG. 1.

DETAILED DESCRIPTION

Figure 1:
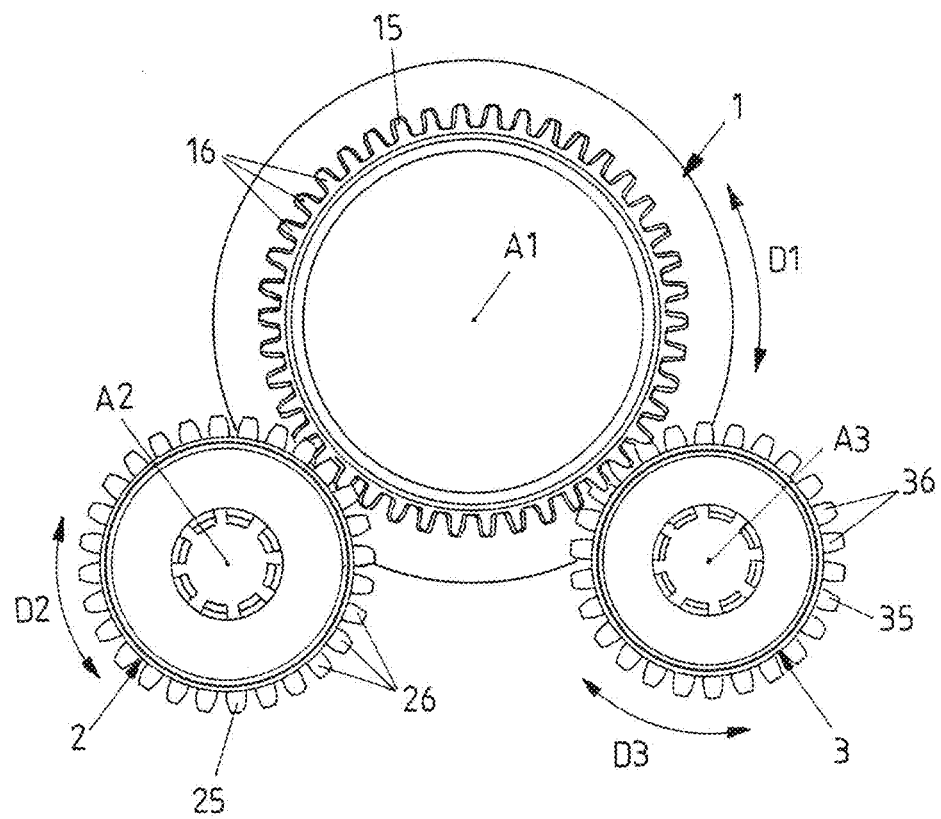
FIG. 1 shows a top view of a gearwheel assembly for a steering angle sensor.

FIG. 1 shows a gearwheel assembly basically known in terms of construction of a steering angle sensor which is equipped and provided for installation in a steering arrangement, in particular a steering wheel arrangement, of a motor vehicle.

The gearwheel assembly shown in FIG. 1 comprises a first gearwheel 1, in the exemplary embodiment in the form of a central gearwheel, which is in engagement with two second gearwheels 2, 3, in the exemplary embodiment in the form of one satellite gearwheel each.

This means that the toothing 15 of the first gearwheel 1 is in engagement (via its teeth 16) with the respective toothing 25, 35 of the second gearwheels 2, 3 (or its teeth 26, 36).

The individual gearwheels 1, 2, 3 each are rotatably mounted about an axis A1, A2, A3. In the exemplary embodiment, the axes A1, A2, A3 extend parallel to each other.

When the steering angle sensor is properly mounted in a steering arrangement, the first gearwheel 1 is coupled with a steering means of the steering arrangement, such as e.g. its steering wheel, such that upon actuation of the corresponding steering means it is rotated about its axis A1, as is described e.g. in DE 101 58 287 A1 or WO 96/27116 A1. Because of the respective engagement, the first gearwheel 1 carries along the second gearwheels 2, 3, so that the same likewise rotate about the corresponding axis A2 or A3.

Figure 6:
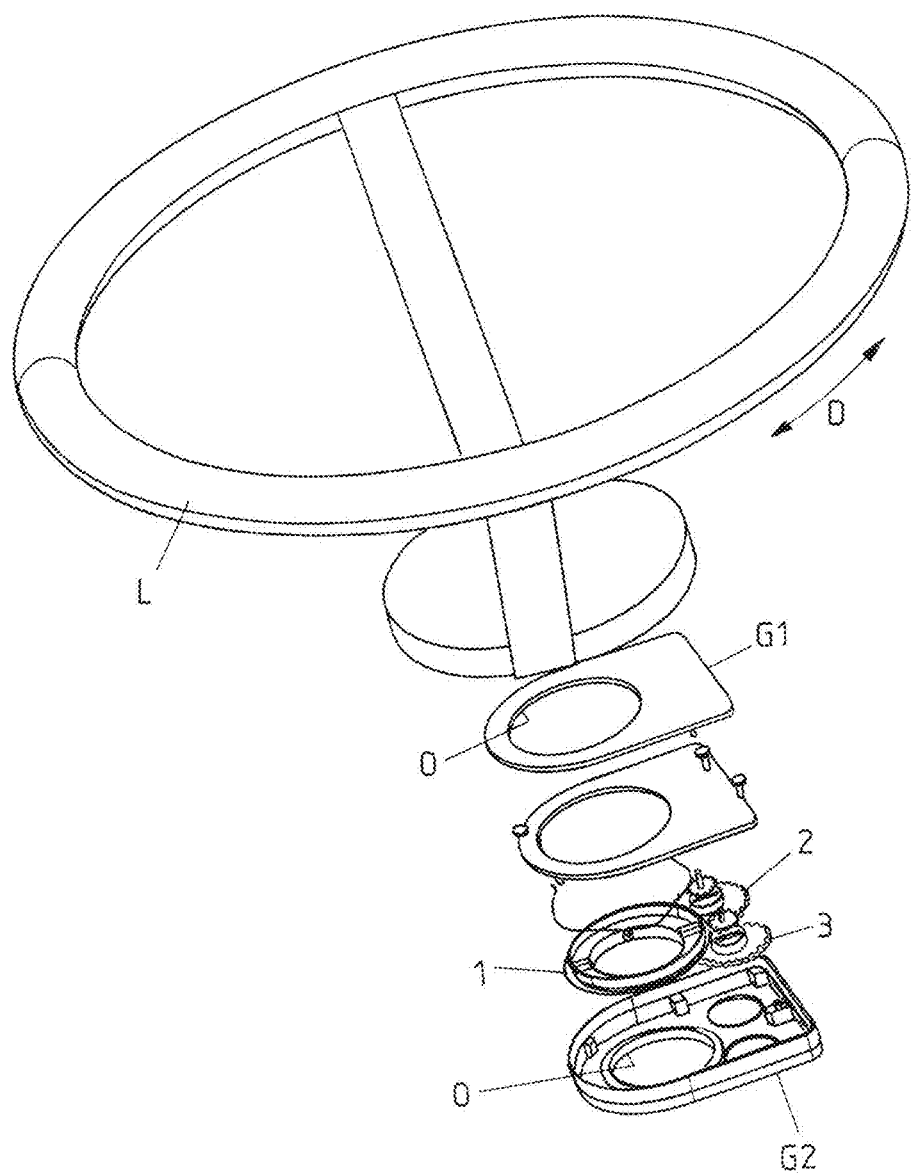
FIG. 6 shows a possible arrangement of the steering angle sensor from FIG. 1 in conjunction with a steering wheel.

In addition, reference should be made to FIG. 6, where the gearwheel assembly of FIG. 1 is shown together with a steering wheel L of a motor vehicle. The gearwheels 1, 2, 3 are arranged in a housing with housing parts G1, G2 and can be coupled with the steering wheel L through an opening O of the housing, so that a rotary movement D of the steering wheel L can be transmitted to the gearwheels 1, 2, 3 and in particular to the first gearwheel 1.

The rotary movement of a respective second gearwheel 2, 3, as will yet be explained in detail below with reference to FIG. 4, is detected by a respectively associated sensor device, so that with known gear ratios—on the one hand with regard to the coupling of the first gearwheel to the steering means and on the other hand with regard to the interaction of the respective second gearwheel 2 or 3 with the first gearwheel 1—a steering angle can be determined therefrom, by which the associated steering means has been rotated.

The steering means need not necessarily be the steering wheel of a steering arrangement. On the one hand, the steering means also can be a component of a steering wheel arrangement downstream of the steering wheel, in particular a part of the so-called steering gear; and on the other hand, instead of a steering wheel another operating element also can be provided, by actuation of which a vehicle is to be steered (by action on a downstream steering gear).

By detecting the rotary movement of one of the second gearwheels 2, 3 each, changes of the relevant steering angle can be determined directly.

If during the interaction of the one second gearwheel 2 with the first gearwheel 1 on the one hand and of the other second gearwheel 3 with the first gearwheel 1 on the other hand different gear ratios are obtained and the two second gearwheels 2, 3 correspondingly each rotate with different speed during a rotation of the first gearwheel 1, the detection of the steering angle of both second gearwheels 2, 3 also provides for an absolute determination of the steering angle. The different gear ratios for example can be achieved by a different size and/or different number of teeth of the second gearwheels 2, 3.

Steering angle sensors with a gearwheel assembly of the type shown in FIG. 1, which are properly integrated into a steering arrangement of a motor vehicle, are known. By way of example, reference is made to DE 101 58 287 A1 and WO 96/27116 A1.

Figure 2:
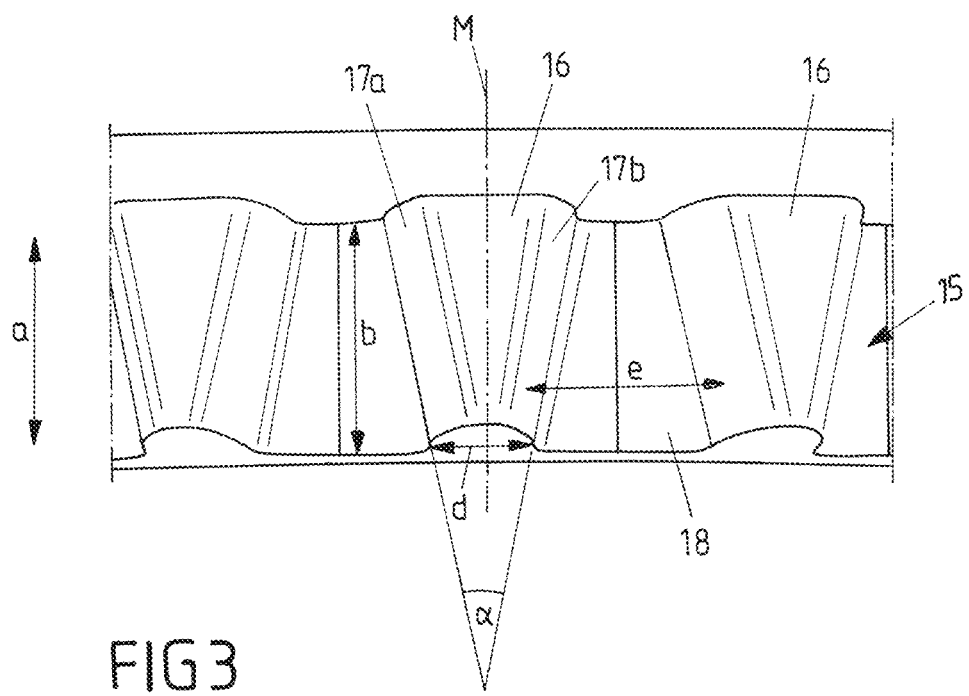
FIG. 2 shows a section of a first gearwheel from FIG. 1 in the region of individual teeth.

For the accuracy in the determination of the steering angle, in particular in the case of a reversal of the direction of rotation during the actuation of the associated steering arrangement, the clearance along the rotary or circumferential direction D1, D2, D3 of the gearwheels 1, 2, 3 in engagement with each other (rotary or circumferential clearance) should be as small as possible. According to FIG. 2 it therefore is provided in the present case that the teeth of at least one of the gearwheels, shown in FIG. 2 by way of example for the teeth of the first gearwheel 1, are tapered in axial direction a or along the tooth width b, with the axial direction a being defined by the axis of rotation of the corresponding gearwheel. This means that the tooth thickness d of a respective tooth 16 varies along the tooth width b, as can be seen in FIG. 2. Correspondingly, the tooth gap width e of the gaps 18 formed between the teeth 16 also varies along the tooth width b.

The tapering of the teeth 16 along the tooth width b also can be described such that the flanks 17a, 17b of a respective tooth 16 extend with an inclination towards the axial direction a or a middle axis M (extending parallel to the axial direction a) of the respective tooth 16 and thereby run towards each other (at an angle α).

In the exemplary embodiment of FIG. 2, the teeth 16 concretely are tapered conically as seen in cross-section. This means that the two tooth flanks 17a, 17b of a respective tooth 16, which run towards each other, are inclined by the same absolute amount with respect to the middle axis M of the tooth. Expressed in other words, the two flanks 17a, 17b of a respective tooth 16 at each point along the tooth width b have the same distance b/2 (=half a tooth thickness) from the middle axis M of the respective tooth 16. Depending on the application, the distances from that middle axis however also can be different (asymmetrical).

The tooth flank profiles at the teeth 16 can be designed such that a cross-section vertical to the axis of rotation A1 of the gearwheel 1 through one of the tooth flanks 17a, 17b of a respective tooth 16 at various points along the tooth width b leads to flank courses which at least sectionally, namely for the same radial distance from the axis of rotation A1, can be made to coincide with each other. Or expressed in other words, the tooth flank profile for a respective flank 17a, 17b in transverse sections (vertical to the axis of rotation A1) arbitrarily arranged along the tooth width b can be made to overlap each other by rotation about that axis of rotation A1 in regions of the same radial expansion of the tooth flanks for the different transverse sections.

In that the teeth 16 of the first gearwheel 1 are tapered along the tooth width b, the same can be fitted into the gaps of the toothing 25 or 35 of a second gearwheel 2, 3 in engagement therewith in axial direction a such that the clearance in circumferential direction or rotary direction of the gearwheels is (largely) eliminated.

Alternatively or in addition to the design of the teeth 16 of the first gearwheel 1 as described with reference to FIG. 2, which teeth are tapered along the tooth width b, a corresponding design of the teeth 26, 36 of a respective second gearwheel 2, 3 can be provided.

Figure 3:
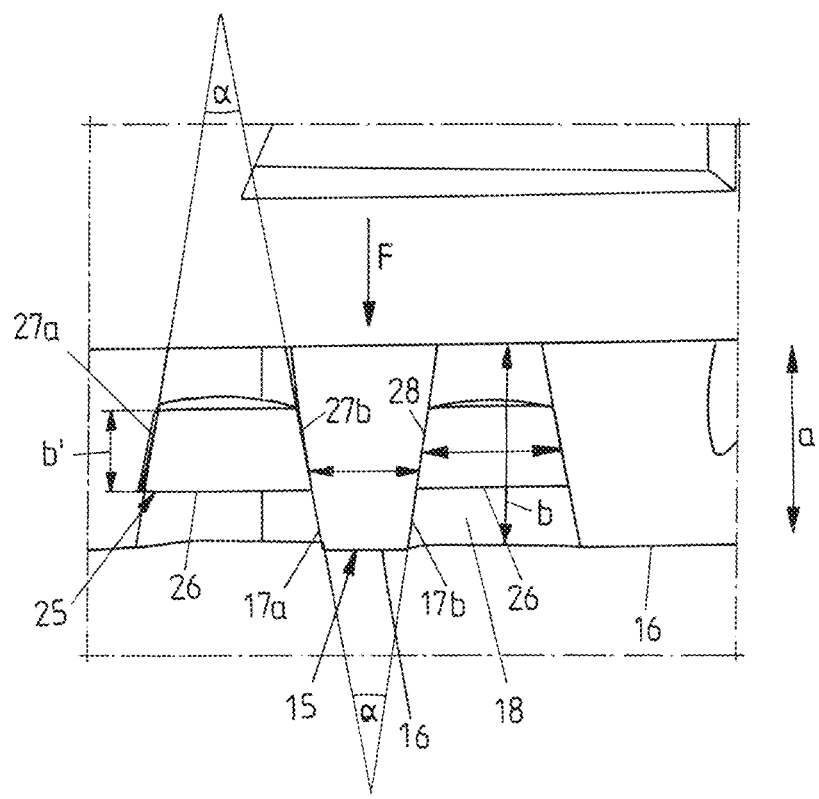
FIG. 3 shows a section through the engagement of two gearwheels from FIG. 1.

FIG. 3 by way of example shows an engagement of individual teeth 16 of the toothing 15 of the first gearwheel 1 into the toothing 25 of a second gearwheel 2 in a variant according to which both the teeth 16 of the first gearwheel 1 and the teeth 26 of the second gearwheel 2 each are tapered in axial direction a or along the tooth width b, b', namely with an orientation opposite to each other. This means that the teeth 26 of the second gearwheel 2 are flared (by varying the tooth thickness d') along the direction in space along which the teeth 16 of the first gearwheel 1 are tapered, and vice versa.

When in such a configuration the angles of inclination of the tooth flanks 17a, 17b of the teeth 16 of the first gearwheel 1 on the one hand and the tooth flanks 27a, 27b of the teeth 26 of the second gearwheel 2 on the other hand are chosen such that in terms of amount the same inclinations of the respective tooth flanks with respect to the axial direction a are present in the first and the second gearwheel 1, 2, but with an opposite spatial orientation, as shown in FIG. 3, the tooth flanks 17a, 17b of the first gearwheel 1 on the one hand and the tooth flanks 27a, 27b of the second gearwheel 2, 3 on the other hand run towards each other at the same angle α and the toothings 15, 25 on both sides can be fitted into each other in axial direction a such that the tooth flanks 17a, 17b and 27a, 27b on both sides rest against each other (flatly, by wedge action) without clearance.

The teeth 16, 26 of the respective gearwheel 1, 2 correspondingly penetrate into an associated gap 28, 18 of the respectively other gearwheel 2, 1 to such a depth (in axial direction) that freedom from clearance is achieved.

To durably ensure fitting in of the toothings 16, 26 on both sides in axial direction a, a force F can be applied onto at least one of the two gearwheels 1, 2 in axial direction a, as indicated in FIG. 3.

FIG. 4 shows the gearwheel assembly from FIG. 1 in an exploded representation together with further components of the corresponding steering angle sensor. It can be seen there that the base body 10 of the first gearwheel 1 forms a receptacle 11 in which two coupling elements 12 are arranged, via which the gearwheel 1 can be coupled with a steering means of an associated steering arrangement, e.g. in that a carrier of the steering means engages behind the coupling elements 12 such that by action of the corresponding carrier the first gearwheel 1 is rotated upon actuation of the steering means.

Furthermore, FIG. 4 shows a spring element 4, in the exemplary embodiment in the form of a sinuous spring, by means of which a force can be exerted on the first gearwheel 1 in axial direction a, in order to hold the same in engagement with the respective second gearwheel 2, 3 in axial direction, as explained already with reference to FIG. 3. Alternatively or in addition, a spring element for generating an axial pretension also can act on a respective second gearwheel 2, 3, in order to hold the same in engagement (without clearance) with the first gearwheel 1 in axial direction a.

According to FIG. 4, each of the second gearwheels 2, 3 also carries a magnet 22, 32 on its base body 20, 30 (or more exactly in a receptacle 21, 31 formed thereon). The magnetic field generated by the respective magnet 22, 32 and its direction of magnetization change in space during a rotary movement of the respective second gearwheel 2, 3. This can be detected by a detector 5a, 5b, e.g. in the form of a Hall sensor, which is associated to the respective second gearwheel 2, 3. On this basis, the steering angle of an associated steering arrangement can be determined, as described above with reference to FIG. 1.

Using the example of the first gearwheel 1, FIG. 5 finally shows how a respective gearwheel 1, 2, 3 of the gearwheel assembly can be mounted axially, in order to provide for a (limited) axial shiftability under the action of the elastic element, e.g. in the form of the spring element 4. Accordingly, the first gearwheel 1 for this purpose is movably guided in axial direction a by means of a guide 14, 64. The guide here is formed by a guide opening 14, in the exemplary embodiment in the form of a groove, which extends in axial direction a, and by a guide element 64 engaging therein, in the exemplary embodiment in the form of a circumferential web. The guide opening 14 by way of example is formed on the first gearwheel 1, and the guide element 64 protrudes from a housing 6 of the steering angle arrangement as raised edge.

The invention claimed is:

1. A steering angle sensor, equipped for installation in a steering arrangement of a motor vehicle, comprising a rotatably mounted first gearwheel which upon actuation of the steering arrangement rotates about an axis, and at least one rotatably mounted second gearwheel which is in engagement with the first gearwheel and is carried along with a rotary movement of the first gearwheel, so that with reference to a rotary movement of the second gearwheel a steering angle of the steering arrangement can be determined, wherein the teeth of at least one of the gearwheels are tapered in an axial direction along the tooth width such that a respective tooth of the one gearwheel, which is tapered along the tooth width, with wedge action can be fitted into a tooth gap of the gearwheel in engagement therewith, wherein at least one of the gearwheels is elastically pretensioned in the axial direction against the gearwheel in engagement therewith, and wherein the elastically pretensioned gearwheel is movably mounted in the axial direction by means of an axial guide, wherein the axial guide limits an axial movement of the pretensioned gearwheel and comprises an axially extending guide opening formed on the pretensioned gearwheel and a guide element therein, wherein the guide element protrudes from a housing of the steering angle sensor.

2. The steering angle sensor according to claim 1, wherein a respective tooth of the one gearwheel, which is tapered along the tooth width, with wedge action is fitted into a tooth gap of the gearwheel in engagement therewith such that the teeth of the gearwheels rest against each other without clearance in direction of rotation of the respective gearwheel.

3. The steering angle sensor according to claim 1, wherein the teeth of the one gearwheel are conically tapered in cross-section.

4. The steering angle sensor according to claim 1, wherein the teeth of the first gearwheel on the one hand and the teeth of the at least one second gearwheel on the other hand are tapered with opposite spatial orientation along the respective tooth width.

5. The steering angle sensor according to claim 1, wherein the axis of rotation of the first gearwheel and the axis of rotation of the at least one second gearwheel extend parallel to each other.

6. The steering angle sensor according to claim 4, wherein the axis of rotation of the first gearwheel and the axis of rotation of the at least one second gearwheel extend parallel to each other and the tooth flanks of the teeth of the first gearwheel on the one hand and the tooth flanks of the teeth of the at least one second gearwheel on the other hand run towards each other under the same angle in terms of amount.

7. The steering angle sensor according to claim 6, wherein the tooth flanks on both sides of the gearwheels in engagement with each other rest against each other.

8. The steering angle sensor according to claim 1, wherein a cross-section vertical to the axis of rotation of a respective gearwheel through a tooth flank of a respective tooth at various points along the tooth width leads to flank courses which at least sectionally can be made to coincide with each other.

9. The steering angle sensor according to claim 1, wherein for generating the pretension an elastic element is provided.

10. The steering angle sensor according to claim 9, wherein the elastic element is designed as a spring.

11. The steering angle sensor according to claim 1, wherein on the first gearwheel at least one coupling element is arranged for coupling the first gearwheel with the steering arrangement.

12. The steering angle sensor according to claim 1, wherein to the at least one second gearwheel a sensor device is associated, by means of which a rotary movement of the second gearwheel can be detected.

13. The steering angle sensor according to claim 12, wherein the sensor device comprises a magnet arranged on the second gearwheel and a detector for detecting a magnetic field generated by the magnet.

14. The steering angle sensor according to claim 1, wherein two second gearwheels are in engagement with the first gearwheel, wherein the teeth of at least one of the gearwheels each in engagement with each other are tapered in axial direction along the tooth width such that a respective tooth of the one gearwheel, which is tapered along the tooth width, with wedge action can be fitted into a tooth gap of the gearwheel in engagement therewith.

15. The steering angle sensor according to claim 14, wherein when the first gearwheel interacts with the one second gearwheel another gear ratio exists than in interaction of the first gearwheel with the other second gearwheel.

16. A steering arrangement for steering a motor vehicle with a steering angle sensor according to claim 1 for determining an angle of rotation of the steering arrangement.

* * * * *